VEHICLE CANOPY

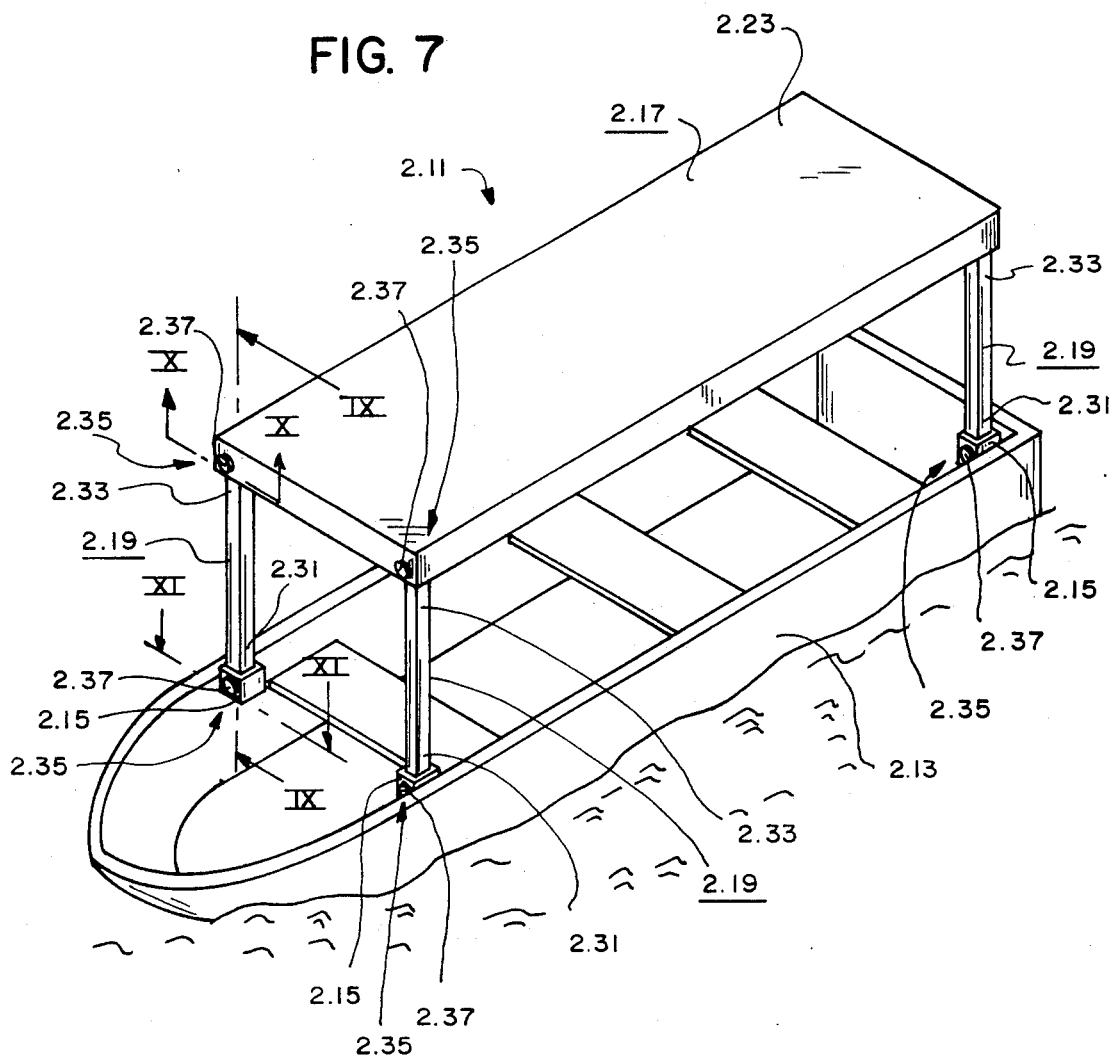

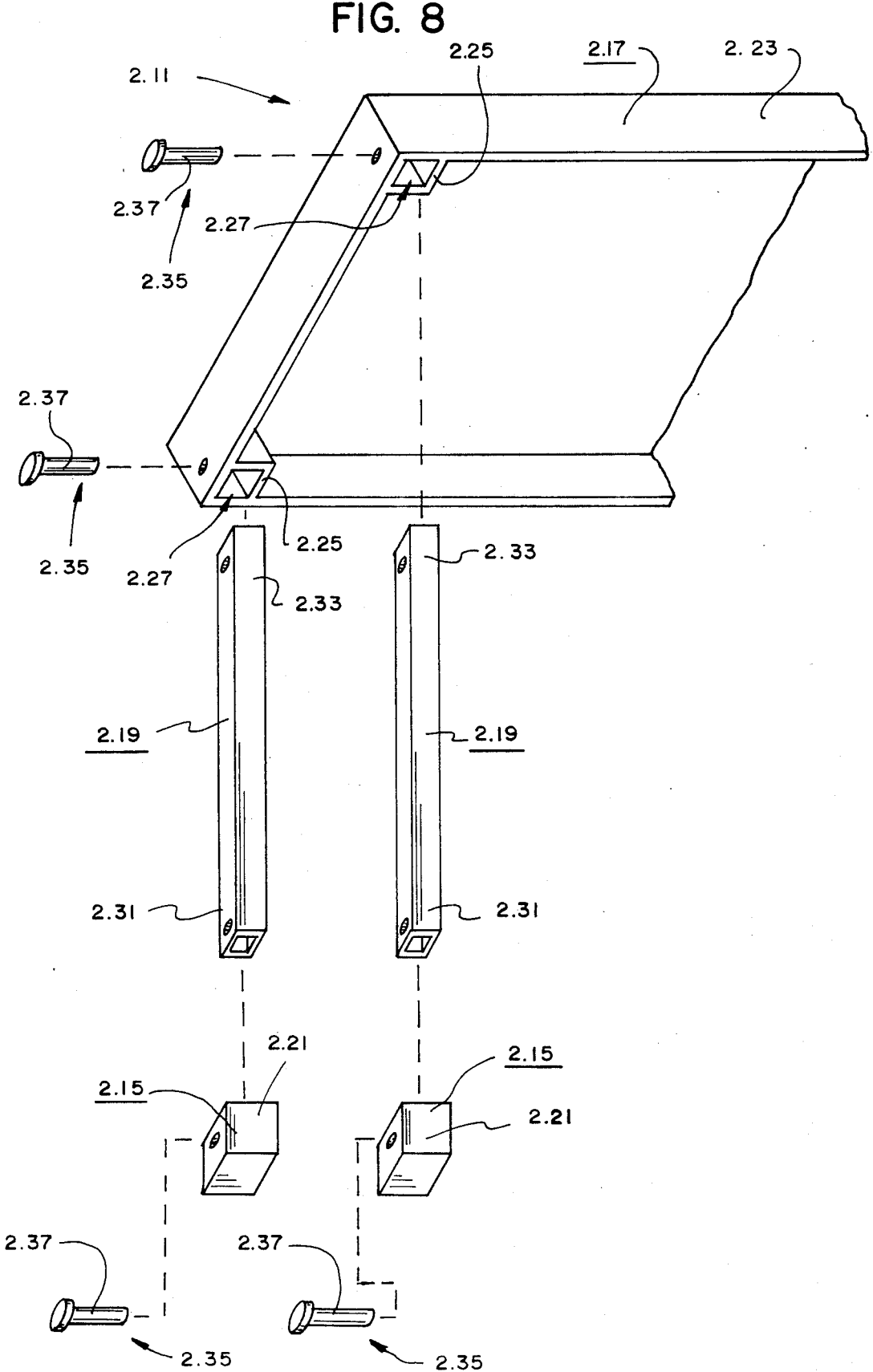

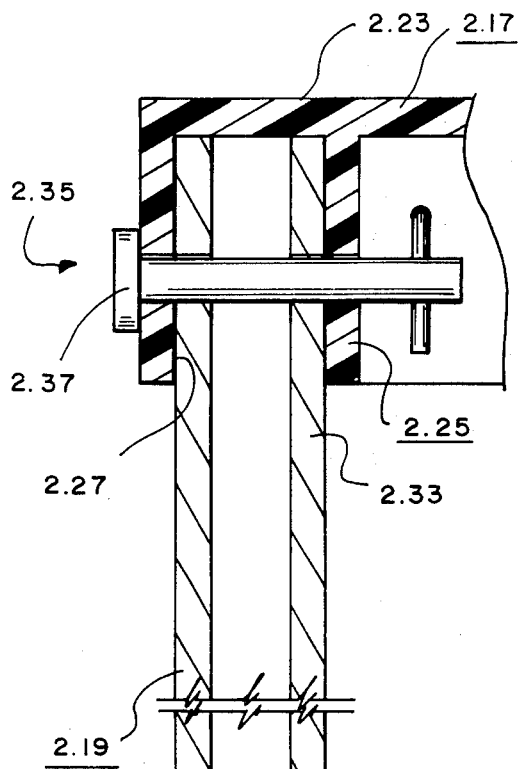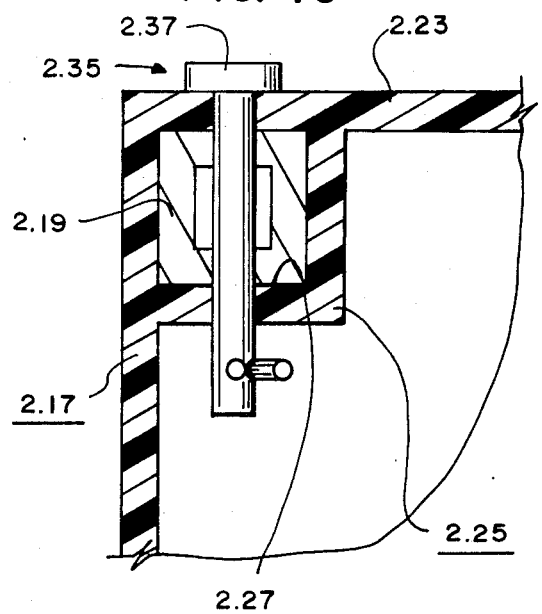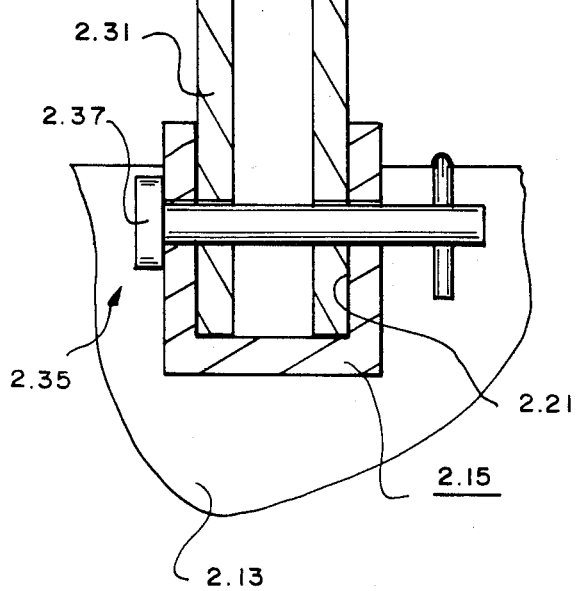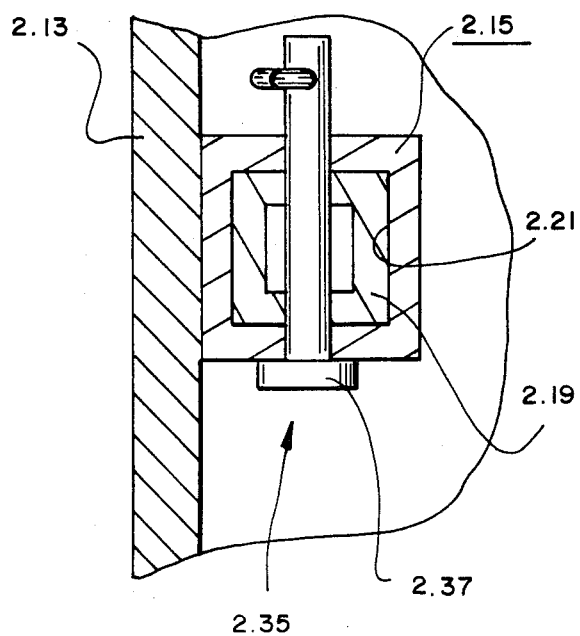

BACKGROUND OF THE INVENTION

1. Field of the Invention

The present invention relates in general to canopies, covers and the like for vehicles such as boats, lawn and garden tractors, etc.

2. Description of the Related Art

Various means have heretofore been developed for providing protection from the sun and the like for the driver and/or occupants of boats, lawn and garden tractors, etc. A preliminary patentability search conducted in class 296, subclasses 102 and 215 and class 297, subclass 184 produced the following patents: Williams, U.S. Pat. No. 2,267,227; Hall, U.S. Pat. No. 2,539,951; Meldrum, U.S. Pat. No. 2,714,387; Neidetcher, U.S. Pat. No. 2,715,044; Schumaker, U.S. Pat. No. 2,785,002; Barenyi, U.S. Pat. No. 2,946,624; Duncan, U.S. Pat. No. 3,436,118; Koch, U.S. Pat. No. 3,561,816; Rhodes, U.S. Pat. No. 3,848,921; Hines et al, U.S. Pat. No. 4,037,614; and Richards, U.S. Pat. No. 4,389,057. None of the above patents disclose or suggest the present invention. While it is apparent from the above prior art that it is often desirable to provide a canopy or the like for various open vehicles, the prior art has failed to provide a portable, rigid, transparent canopy for vehicles such as boats, lawn and garden tractors, etc.

SUMMARY OF THE INVENTION

The present invention is directed toward providing an improved vehicle canopy for boats, riding lawn mowers, lawn and garden tractors, etc.

The concept of the present invention is to provide a canopy for an open vehicle, the canopy comprising a plurality of base members attached to the vehicle at spaced locations thereon; a portable, rigid, transparent shield for covering at least a portion of the vehicle, the shield including a body member and including a plurality of head members attached to the body member at spaced locations thereon; and a plurality of elongated post members removably attaching the shield to the base members, each of the post members having a lower end removably attached to a respective one of the base members and having an upper end removably attached to a respective one of the head members.

BRIEF DESCRIPTION OF THE DRAWINGS

FIG. 7 is a perspective view of a boat showing a second embodiment of the canopy of the present invention attached thereto.

FIG. 8 is an exploded perspective view of the second embodiment of the canopy of the present invention.

FIG. 9 is an enlarged sectional view substantially as taken on line IX—IX of FIG. 7.

FIG. 10 is an enlarged sectional view substantially as taken on line X—X of FIG. 7.

FIG. 11 is an enlarged sectional view substantially as taken on line XI—XI of FIG. 7.

DESCRIPTION OF THE PREFERRED EMBODIMENT

Figure 1:
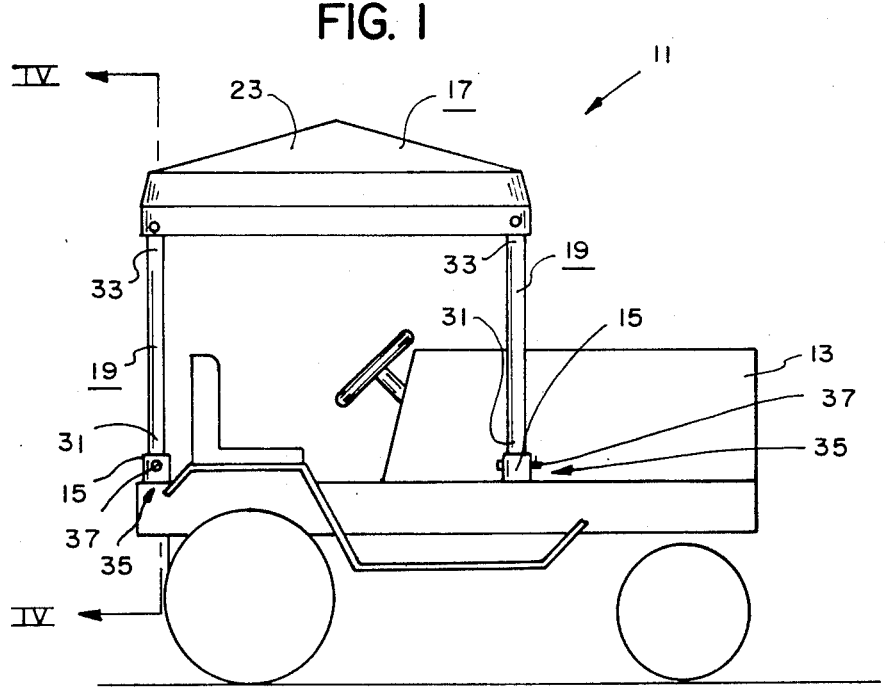
FIG. 1 is a side elevational view of a garden tractor showing a first embodiment of the canopy of the present invention attached thereto.
Figure 2:
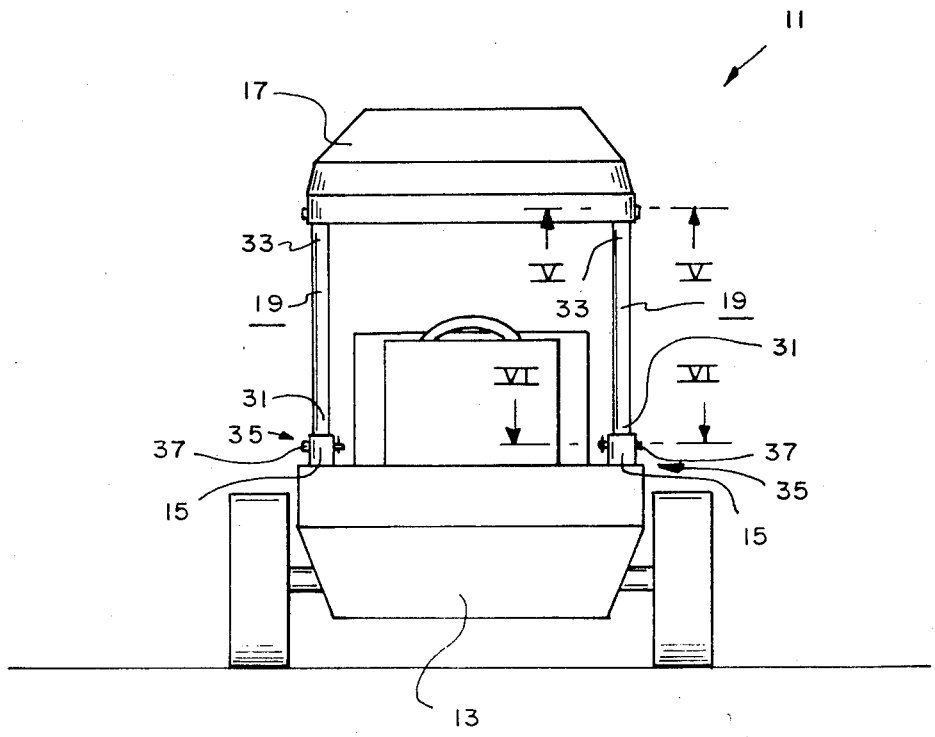
FIG. 2 is a front elevational view of FIG. 1.
Figure 3:
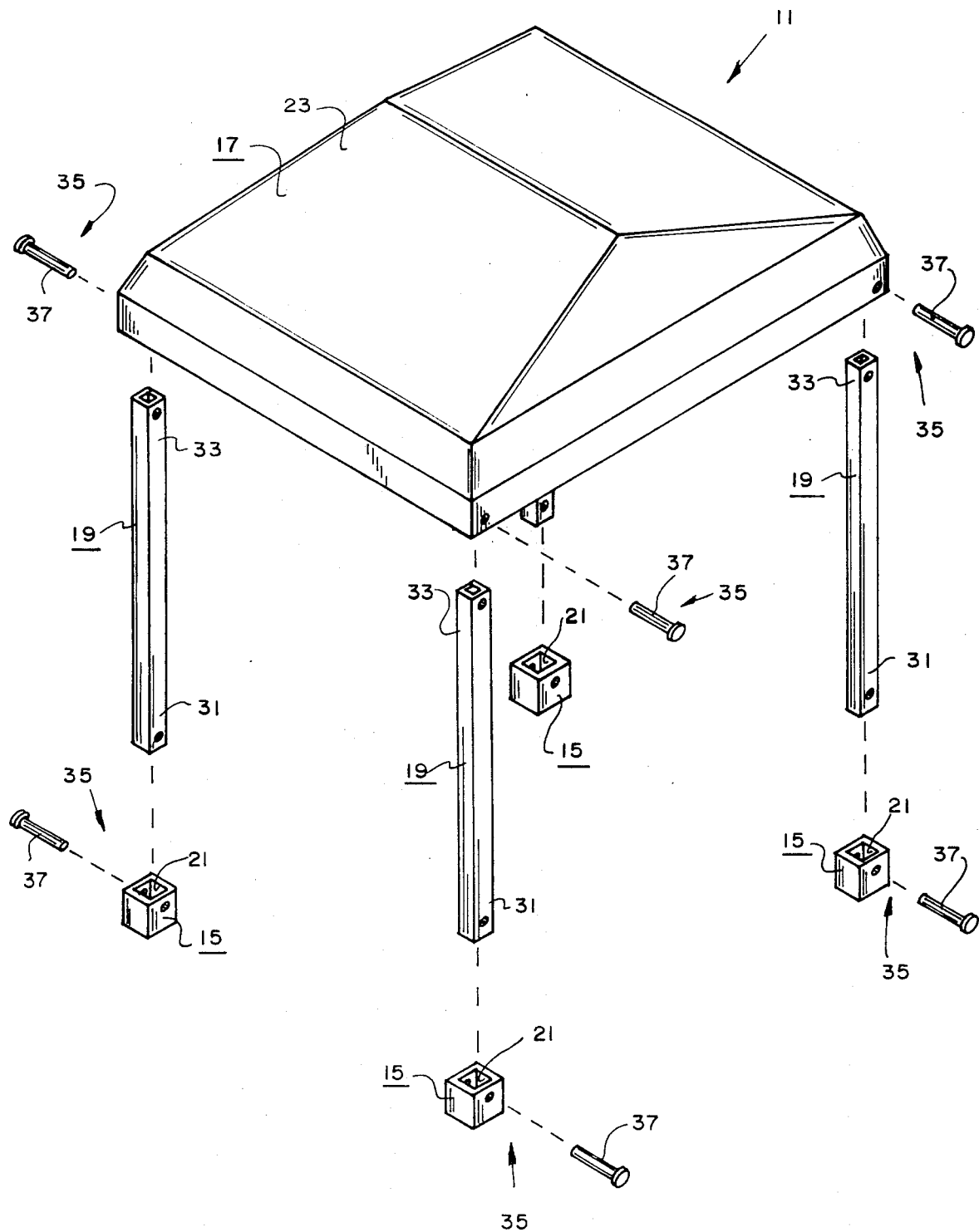
FIG. 3 is an exploded perspective view of the first embodiment of the canopy of the present invention.
Figure 4:
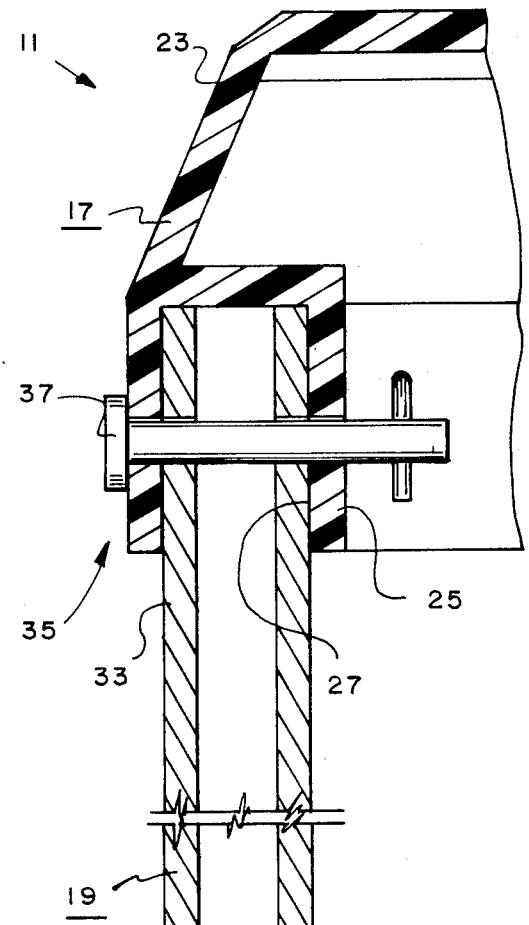
FIG. 4 is an enlarged sectional view substantially as taken on line IV—IV of FIG. 1.
Figure 5:
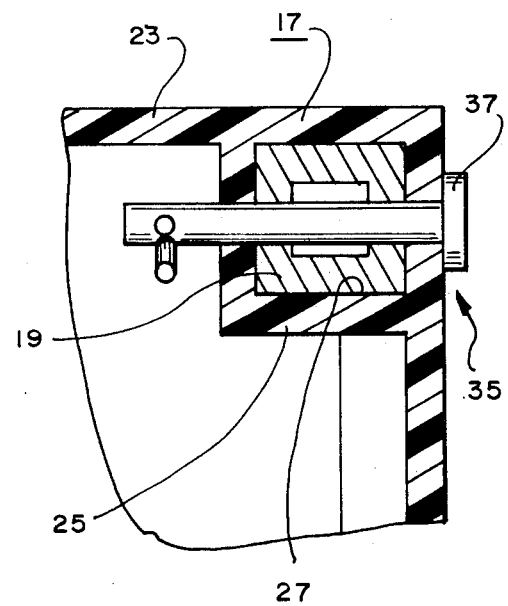
FIG. 5 is an enlarged sectional view substantially as taken on line V—V of FIG. 2.
Figure 6:
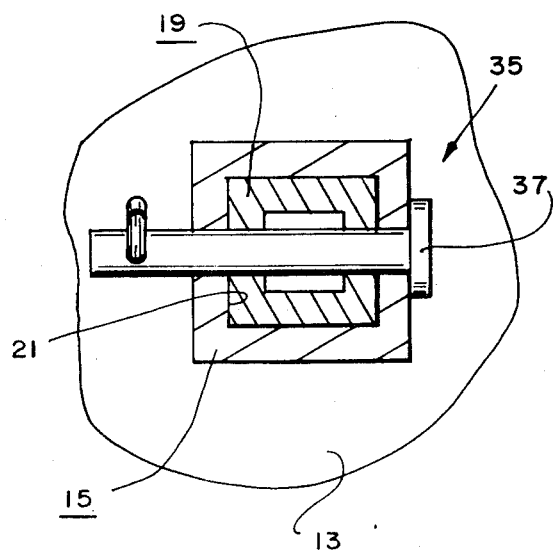
FIG. 6 is an enlarged sectional view substantially as taken on line VI—VI of FIG. 2.

A first embodiment of the canopy of the present invention is shown in FIGS. 1–6 and identified by the numeral 11. The canopy 11 is for use with an opened vehicle 13 and is designed specifically for use with riding lawn mowers, lawn and garden tractors and the like. The canopy 11 comprises in general a plurality of base members 15 attached to the vehicle 13 at spaced locations thereon, a portable, rigid, transparent shield 17 for covering at least a portion of the vehicle 13, and a plurality of elongated post members 19 removably attaching the shield 17 to the base members 15.

Each base member 15 has an upwardly opening cup-like cavity 21 therein and may be constructed out of metal or the like and welded or otherwise fixedly attached to the vehicle 13. The canopy 11 preferably includes four base members 15 attached to the vehicle 13 at spaced locations thereon so as to form the four corners of an imaginary square.

The shield 17 includes a body member 23 and includes a plurality of head members 25 attached to the body member 23 at spaced locations thereon. Each head member 25 may have a downwardly opening cup-like cavity 27 and may be formed integral with or otherwise fixedly attached to the body member 23. The shield 17 is preferably manufactured from ¼ inch thick tinted smoke or tinted bronze Lucite Acrylic sheeting. The body member 23 is molded into a substantially square shaped figure with the four corners thereof smooth and pointed at the edges with an outwardly protruded overhang of approximately four inches. The overhang serves as added protection against sun rays, etc. The portion of the body member 23 above the overhang may be in the general shape of a hip roof and the overhang may consist of extensions of such structure. The head members 25 are preferably formed integral with the body member 23 and located at the corners of the overhang. The shield 17 is preferably treated with a scratch resistant finish and with a hardening agent to insure strength and stability as will now be apparent to those skilled in the art. The exact dimensions of the shield 17 will depend to a large extent on the dimensions of the vehicle 13 as will now be apparent to those skilled in the art.

Each post member 19 has a lower end 31 removably attached to a respective one of the base members 15 and has an upper end 33 removably attached to a respective one of the head members 25. The ends 31, 33 of each post member 19 are preferably shaped and sized so as to fit into the respective base member 15 or head member 25 in a substantially tight, friction-fit manner. The ends 31, 33 of the post members 19 and the cavities 21, 27 are preferably square shaped in cross section. Each post member 19 preferably consist of an elongated member having a square cross section. The post members 19 may be fabricated out of sturdy, light-weight metal with a smooth outer finish in any manner now apparent to those skilled in the art.

The canopy 11 may include lock means 35 for locking the ends 31, 33 of the post members 19 to the respective base members 15 or head members 25. Each lock means 35 may consist simply of a pin 37 for extending through each of said base members having an upwardly opening cavity therein;

(b) a portable, rigid, transparent tinted acrylic shield member for covering at least a portion of the cab of said tractor, said shield member including a body member and including a plurality of head members attached to said body member at spaced locations thereon, each of said head member having a downwardly opening cavity therein; said body member and said head members of said shield being constructed as an integral, one-piece unit out of an acrylic material; and (c) a plurality of elongated post members removably attaching said shield member to said base members, each of said post members having a lower end removably extending into said upwardly opening cavity of a respective one of said base members and having an upper end removably extending into said downwardly opening cavity of a respective one of said head members; said upper and lower ends of each of said post members being sized and shaped so as to freely slide into the respective one of said cavities of said base members and said head members in a substantially tight, friction-fit manner.

* * * * *

United States Patent [19]

Nakata et al.

[11] Patent Number: 4,772,065
[45] Date of Patent: Sep. 20, 1988

[54] TRACTOR CABIN AND MANUFACTURING METHOD THEREFOR

[75] Inventors: Masaru Nakata, Sakai; Kenichi Sato, Sennan; Katsushi Fukawatase, Sakai; Susumu Arisawa, Kawachinagano; Yasunori Kurata, Sakai; Kengo Sato, Sakai; Hiroaki Taniguchi, Sakai, all of Japan

[73] Assignee: Kubota, Ltd., Osaka, Japan

[21] Appl. No.: 39,825

[22] Filed: Apr. 15, 1987

Related U.S. Application Data

[63] Continuation of Ser. No. 775,858, Sep. 13, 1985, abandoned.

[30] Foreign Application Priority Data

Nov. 26, 1984 [JP] Japan .................. 59-179023
Feb. 20, 1985 [JP] Japan .................. 60-32322
Feb. 20, 1985 [JP] Japan .................. 60-32323

[51] Int. Cl.$^4$ ............................................. B60J 1/00
[52] U.S. Cl. ........................... 264/279; 296/201; 296/96.21
[58] Field of Search .................... 296/190, 146, 78 R, 296/84 R, 84 A, 84 D, 84 E, 93, 197, 200, 201; 119/5; 49/501, 506; 264/279

[56] References Cited

U.S. PATENT DOCUMENTS

| | | | |
|---|---|---|---|
| 2,043,756 | 6/1936 | Lalancette | 296/200 X |
| 2,061,788 | 11/1936 | Wright | 296/200 |
| 2,319,004 | 5/1943 | Lotter | 49/501 X |
| 2,326,789 | 8/1943 | Marine | 296/200 |
| 3,230,677 | 1/1966 | Brown | 296/93 X |
| 3,397,008 | 8/1968 | Timmerman | 296/190 |
| 4,099,763 | 7/1978 | Maier et al. | 296/93 X |
| 4,147,131 | 4/1979 | Walker | 119/5 |
| 4,152,022 | 5/1979 | Castine | 296/190 X |
| 4,162,097 | 7/1979 | Scribner | 296/190 |
| 4,368,797 | 1/1983 | van der Lely | 296/190 X |
| 4,418,955 | 12/1983 | Muncke et al. | 296/190 |
| 4,624,500 | 11/1986 | Heitman | 296/190 X |
| 4,669,564 | 6/1987 | Kreutz | 296/190 X |

FOREIGN PATENT DOCUMENTS 545199  2/1956  Belgium ........................ 296/93

Primary Examiner—Robert B. Reeves
Assistant Examiner—Russell D. Stormer
Attorney, Agent, or Firm—Jordan and Hamburg

[57] ABSTRACT

The disclosed invention provides a tractor cabin and a manufacturing method therefor. A main transparent plate and side transparent plates are caused to adhere to one another or otherwise become an integral whole, by a substantially transparent filling material, to constitute a gate-shaped front face of the cabin.

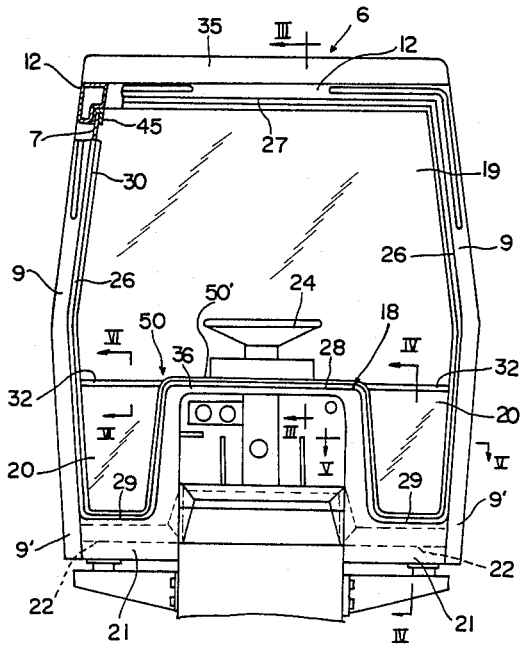

1 Claim, 5 Drawing Sheets